United States Patent [19]

Suzuki

[11] Patent Number: 4,961,067
[45] Date of Patent: Oct. 2, 1990

[54] PATTERN DRIVEN INTERRUPT IN A DIGITAL DATA PROCESSOR

[75] Inventor: Minoru Suzuki, Tokyo, Japan

[73] Assignee: Motorola, Inc., Schaumburg, Ill.

[21] Appl. No.: 889,998

[22] Filed: Jul. 28, 1986

[51] Int. Cl.⁵ .............................................. G06F 7/02
[52] U.S. Cl. ................................ 340/146.2; 364/900; 364/941.1; 364/941.7; 364/947.2; 371/24
[58] Field of Search ... 364/200 MS File, 900 MS File, 364/; 307/445, 471; 371/24, 26; 340/146.2

[56] References Cited

U.S. PATENT DOCUMENTS

| | | | |
|---|---|---|---|
| 4,035,780 | 7/1977 | Kristick et al. | 364/900 |
| 4,063,081 | 12/1977 | Handly et al. | 235/312 |
| 4,090,238 | 5/1978 | Russo | 364/200 |
| 4,106,091 | 8/1978 | Hepworth et al. | 364/200 |
| 4,128,874 | 12/1978 | Pertl et al. | 364/200 |
| 4,181,934 | 1/1980 | Marenin | 364/200 |
| 4,268,906 | 5/1981 | Bourke et al. | 364/200 |
| 4,296,466 | 10/1981 | Guyer et al. | 364/200 |
| 4,349,873 | 9/1982 | Gunter et al. | 364/200 |
| 4,404,627 | 9/1983 | Marcantonio | 364/900 |
| 4,466,099 | 8/1984 | Meltzer | 371/47 |
| 4,527,237 | 7/1985 | Frieder et al. | 364/200 |
| 4,566,069 | 1/1986 | Hirayama et al. | 364/431.12 |
| 4,675,646 | 6/1987 | Lauer | 340/146.2 |
| 4,728,925 | 3/1988 | Randle et al. | 340/146.2 |
| 4,751,673 | 6/1988 | Agarwal et al. | 364/900 |
| 4,807,117 | 2/1989 | Itoku et al. | 364/200 |

Primary Examiner—Gareth D. Shaw
Assistant Examiner—Christina M. Eakman
Attorney, Agent, or Firm—Jonathan P. Meyer

[57] ABSTRACT

A digital data processor of the type having a plurality of data inputs and a plurality of data latches, each coupled to one of said data inputs is modified to accomodate pattern driven interrupt. A plurality of bit comparators, each having inputs coupled to one of the said data inputs and one of said data latches, compare the input pattern to a stored pattern. The outputs of the bit comparators are ANDed to indicate one of a match and a mis-match between the two patterns. Interrupt generation logic is selectable to generate an interrupt request on one of the match and mis-match indications. The apparatus and method are particularly suited to use in a microcontroller which requires fast and software-efficient pattern driven interrupt.

21 Claims, 2 Drawing Sheets

PATTERN DRIVEN INTERRUPT IN A DIGITAL DATA PROCESSOR

FIELD OF THE INVENTION

The present invention relates, in general, to interrupt generation in a digital data processor. More particularly, the invention relates to the generation of interrupt requests in response to predetermined, multiple-bit patterns appearing at data pins of the processor and is particularly suited to microcomputer applications.

BACKGROUND OF THE INVENTION

Interrupts are a well known method of altering the processing flow in a digital data processor in response to an external event. For instance, in a microcomputer which is controlling the operation of an electromechanical system, a change of state of the system may require the generation of an interrupt request to trigger the microcomputer to alter its processing flow in order to perform some special function.

Traditionally, a digital data processor has one or more individual wires which are dedicated to receiving interrupt requests. It is the responsibility of external logic to determine when an interrupt is required and to generate an interrupt request signal on the appropriate wire.

In the field of microcomputers, it may be desired to incorporate into the integrated circuit some ability to determine when an interrupt is necessary. This may be accomplished, for example, by software which monitors the state of a data pin of the microcomputer and generates an interrupt request upon the occurence of some event.

However, it has not been practical up to this point to base the generation of an interrupt request on the occurence of an event comprising the states of multiple data pins of a microcomputer, referred to hereinafter as pattern driven interrupt. The software overhead involved in monitoring multiple data pins, comparing their values to a desired pattern and generating an interrupt request is too great.

SUMMARY OF THE INVENTION

Accordingly, it is an object of the present invention to provide improved pattern driven interrupt in a digital data processor.

Another object of the present invention is to provide practical interrupt request generation in response to the states of multiple data pins of a digital data processor.

Yet a further object of the present invention is to provide a flexible, hardware implementation of pattern driven interrupt generation for use in a microcomputer.

These and other objects and advantages of the present invention are provided by an apparatus for generating interrupt requests comprising a plurality of bit comparators each having an input coupled to a data input of a digital data processor and an input coupled to data storage means of the processor and logic means coupled to outputs of said bit comparators for generating an interrupt request in response to a selected condition of said comparator outputs.

These and other objects and advantages of the present invention will be more apparent to one skilled in the art from the detailed description below taken together with the drawings.

DETAILED DESCRIPTION OF THE INVENTION

Figure 1:
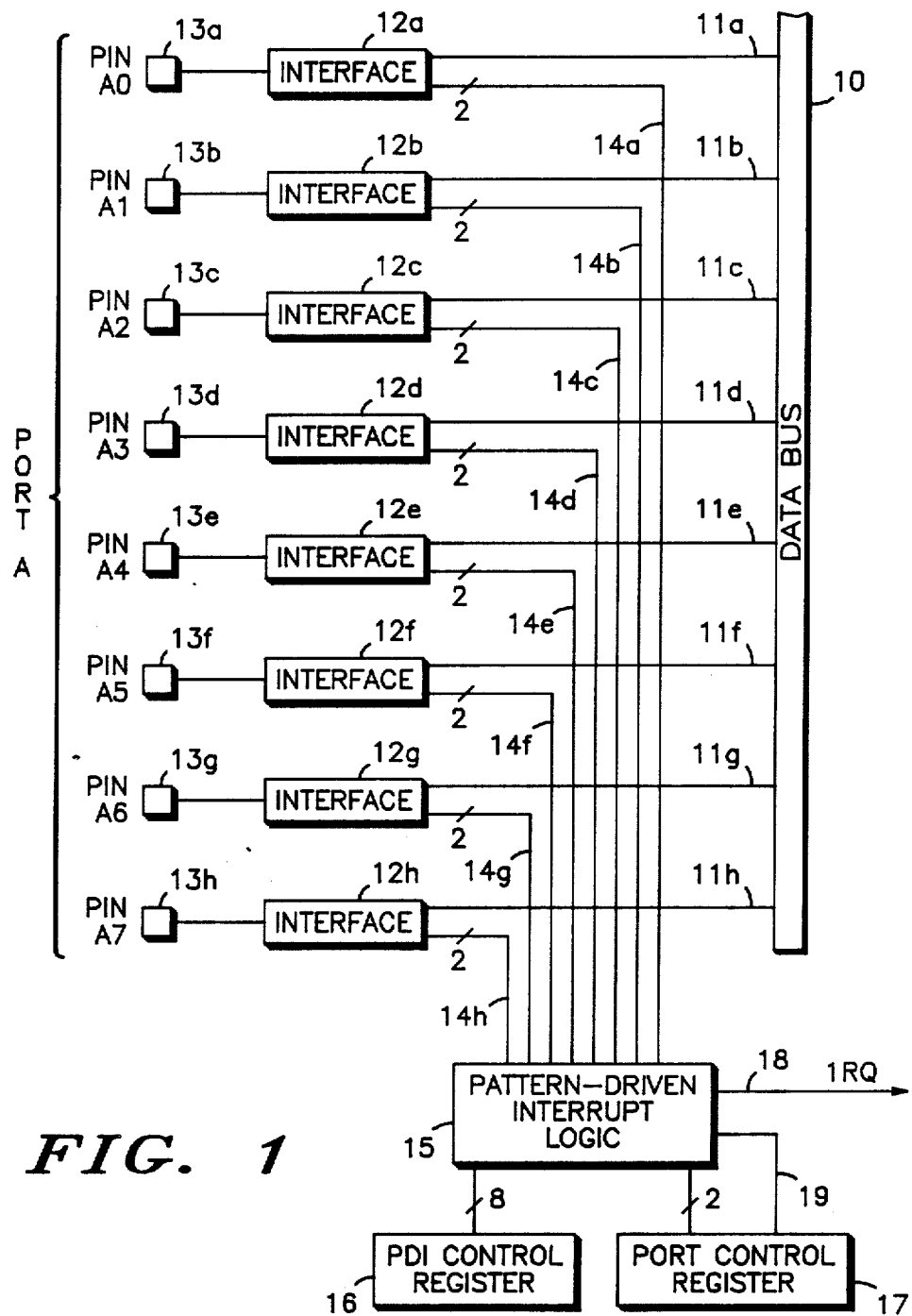
FIG. 1 is a block diagram illustrating a pattern driven interrupt generation apparatus according to the principles of the present invention.

FIG. 1 illustrates a pattern driven interrupt system according to the principles of the present invention in the context of a microcomputer. While the invention is disclosed with reference to a particular embodiment thereof in an eight bit microcomputer, the extension of the principles of the invention to other data processing environments will be apparent to one skilled in the art.

An internal data bus 10 serves the internal data communication needs of the microcomputer and an eight bit I/O port (PORT A) serves for communication between the microcomputer and the rest of the system of which it is a part. Each of the eight pins 13a—13h which comprise PORT A (also referred to as pins A0—A7, respectively) is coupled to data bus 10 by via a bit line (11a—11h, respectively) and a bi-directional I/O interface (12a—12h, respectively). As is conventional, data may be transferred either from pins 13a—13h onto data bus 10 or from data bus 10 onto pins 13a—13h.

Bi-directional I/O interfaces 12a—12h are also coupled, via eight two-bit lines 14a—14h, respectively, to pattern driven interrupt logic 15. Pattern driven interrupt logic 15 is coupled to a PDI control register 16 and a port control register 17 to receive control signals therefrom. Pattern driven interrupt logic 15 is also coupled to an interrupt request line 18 which triggers a central processing unit elsewhere on the microcomputer to commence interrupt processing. Pattern driven interrupt logic 15 is capable, as will be more completely described below, of responding to a particular pattern of data bits appearing on pins 13a—13h and of generating an interrupt request on line 18. Interrupt logic 15 is also coupled to port control register 17 for reasons which will be made more apparent below.

Figure 2:
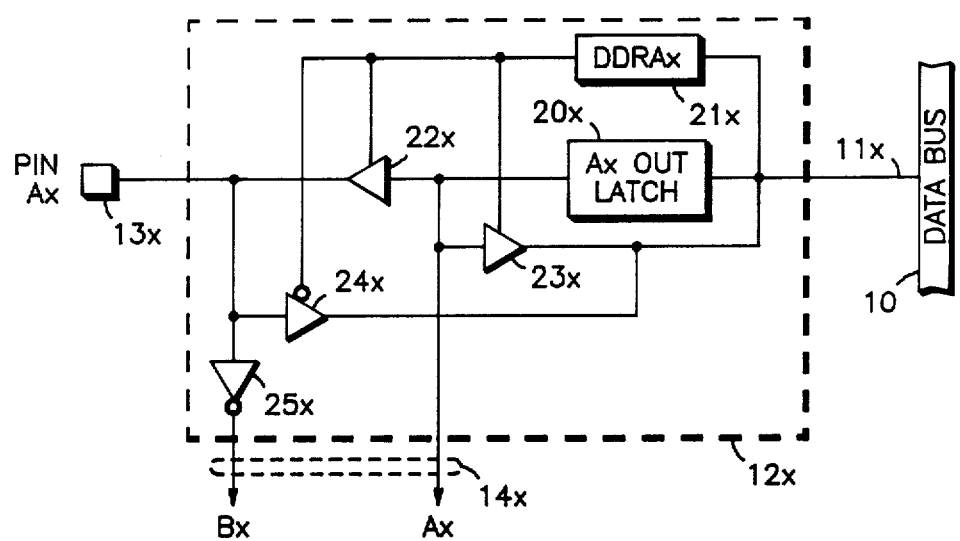
FIG. 2 is a diagram illustrating an input/output pin interface.

FIG. 2 illustrates in greater detail the structure of the bi-directional I/0 interfaces 12a—12h of FIG. 1. A particular interface 12x comprises an output latch 20x, a data direction register 21x, three strobed buffers 22x, 23x and 24x and a non-inverting buffer 25x. Data direction register 21x stores one bit which indicates whether data is being transferred to (input) or from (output) data bus 10. Data direction register 21x has an input coupled to bit line 11x, which is coupled to data bus 10, and an output coupled to enable inputs of strobed buffers 22x, 23x and 24x.

When interface 12x is configured for output, the data value stored in data direction register 21x enables strobed buffers 22x and 23x and disables strobed buffer 24x. A data value from data bus 10 is brought to interface 12x by bit line 11x, is latched by out latch 20x and is placed on pin 13x via strobed buffer 22x. In addition, this data value is routed back to data bus 10 via strobed buffer 23x and bit line 11x in order that the microcomputer may accurately read the value in out latch 20x.

When interface 12x is configured for input, the data value stored in data direction register 21x is such that strobed buffers 22x and 23x are disabled, while strobed buffer 24x is enabled. Thus, a read of PORT A by the microcomputer while interface 12x is so configured will produce the data value currently appearing at pin 13x.

A two-bit line 14x exits interface 12x and serves the pattern driven interrupt hardware. A first bit line Ax is coupled to the output of out latch 20x. A second bit line Bx is coupled to the output of non-inverting buffer 25x, whose input is coupled to pin 13x. Obviously, line Bx carries the value of the input data bit. Line Ax carries whatever value is in out latch 20x. Conventionally, out latch 20x is not used when data is being input and, therefore, does not contain meaningful data. In order to implement the present invention, it is merely necessary to load the appropriate bit of the pattern to be matched into out latch 20x prior to invoking the pattern driven interrupt function. In this manner, each two-bit line pair 14x will carry one input data bit and the appropriate pattern bit to which the input bit should match.

Figure 3:
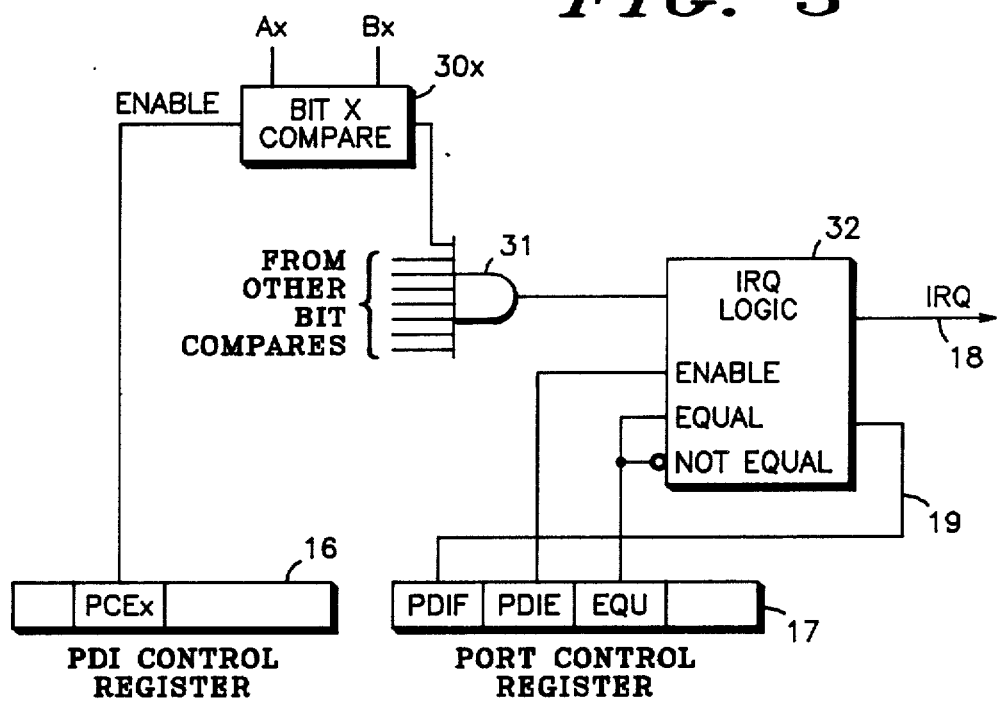
FIG. 3 is a diagram illustrating a portion of the pattern driven interrupt generation logic according to the principles of the present invention.

FIG. 3 illustrates in greater detail pattern driven interrupt logic 15 of FIG. 1. A bit comparator 30x has inputs coupled to bit lines Ax and Bx from interface 12x. The other seven bit comparators, which have inputs coupled to the A and B bit lines from the seven other I/O interfaces, are omitted from FIG. 3 for reasons of clarity. Bit comparator 30x also has an enable input coupled to a bit PCEx storage location of PDI control register 16. PDI control register 16 stores a PCE bit for each bit comparator. Each of the omitted bit comparators has its enable input coupled to the appropriate one of the remaining seven bit storage locations of PDI control register 16.

As is familiar, bit comparator 30x provides one of two indications at its output: a first indication if the data values on bit lines Ax and Bx match and a second indication if the values do not match. Bit comparator 30x is designed so that, if it is disabled by its input from PDI control register 16, it provides the same output as if its inputs Ax and Bx match. The ability to disable selected bit comparators by storing the appropriate control word in PDI control register 16 provides the apparatus with significant flexibility. If a four bit pattern is to be matched, the remaining four inputs bits can safely be ignored simply by disabling the corresponding bit comparators. The "match" output of those comparators provides that those bits will not alter the outcome.

The output of bit comparator 30x, along with the outputs of the other seven bit comparators not shown here, is coupled to an input of an AND gate 31. AND gate 31 produces an active output if, and only if, the outputs of each of the bit comparators indicates a "match". The output of AND gate 31 is coupled to an input of IRQ logic 32. IRQ logic 32 also has an enable input which is coupled to a PDIE bit storage location of port control register 17 and Equal and Not Equal inputs which are both coupled to an EQU bit storage location of port control register 17.

Depending on the state of its inputs, IRQ logic 32 is capable of producing at its output an interrupt request signal. This output is coupled to the microprocessor's interrupt request line IRQ. Obviously, IRQ logic 32 produces an interrupt request only if the bit stored at location PDIE of register 17 enables it to do so. The bit stored at location EQU of register 17 indicates either that interrupts should be generated on a match or a mis-match. That is, if bit EQU indicates that an interrupt should be generated on a match, then IRQ logic 32 will generate an interrupt request only if the output of AND gate 31 indicates that each of the bit comparators has indicated a match. If bit EQU indicates that interrupts should be generated on a mis-match, then IRQ logic 32 will generate an interrupt request only if the output of AND gate 31 indicates that at least one of the bit comparators has indicated a mis-match.

Location PDIF of port control register 17 stores a bit which serves as an interrupt request flag and is coupled to IRQ logic 32. The interrupt request flag may be examined by the microprocessor to determine if an interrupt request has been generated previously in response to the expected input pattern.

The operation of the pattern driven interrupt apparatus described above is relatively straightforward. Several initialization steps are required prior to operation: (1) the data direction registers controlling the I/0 interfaces of PORT A are set to the input mode; (2) the pattern to be matched is loaded from the internal data bus into the out latches of the I/0 interfaces; (3) the appropriate control bits are loaded into the PDI control register and the port control register; and, in some cases (4) the appropriate mask bit must be cleared if the microprocessor is such that interrupts on the IRQ line are maskable. Of course, no particular order is implied by this description of the initialization steps.

The above-described apparatus provides practical pattern driven interrupt generation in a data processor with a relatively small amount of additional hardware and almost no software overhead. Once the apparatus is initialized, the software need not further concern itself with interrupts until one is actually received.

While the present invention has been described with reference to a particular embodiment thereof, various modificiations and changes thereto will be apparent to one skilled in the art and are within the spirit and scope of the present invention.

What is claimed is:

1. In a digital data processor of the type having a plurality of data inputs and data storage means, an apparatus for generating interrupt requests comprising:
   a plurality of bit comparators each having an input coupled to a respective one of said data inputs, an input coupled to said data storage means and an output, said output of each said bit comparator indicating a match when said inputs thereto are in identical logic states;
   match select means for selecting one of a match condition and a mis-match condition; and
   logic means coupled to said match select means and having inputs coupled to said outputs of said bit comparators for generating an interrupt request in response to said bit comparator outputs and said match select means, said logic means generating an interrupt request in response to a first condition of said bit comparator outputs if said match select means selects a match condition and generating an interrupt request in response to a second condition of said bit comparator outputs if said match select means selects a mis-match condition.

2. An apparatus according to claim 1 wherein:
   each of said bit comparators has an enable input and, in the absence of an enable signal present at said enable input, produces an output indicating a match regardless of the logic states of the other inputs thereto.

3. An apparatus according to claim 2 further comprising:

comparator enable means coupled to said enable inputs of said bit comparators for individually selectably enabling each of said bit comparators.

4. An apparatus according to claim 1 wherein each of said plurality of data inputs is also a data output and said data storage means further comprises:
   a plurality of output latches, each said output latch being selectably coupled to one of said data inputs.

5. An apparatus according to claim 1 further comprising:
   interrupt enable means for selectably enabling said logic means.

6. An apparatus according to claim 1 wherein said logic means further comprises:
   first means for performing an AND function, said first means having a plurality of inputs, each coupled to one of said bit comparator outputs; and
   second means having an input coupled to an output of said first means for generating an interrupt request responsive to a selected state of said first means output.

7. In a microcomputer of the type having a plurality of data pins and a plurality of interfaces, each of said interfaces being selectably coupled to a respective one of said data pins and each of the interfaces having a latch, an apparatus for generating an interrupt request comprising:
   a plurality of bit comparators, each having an input coupled to one of said data pins, an input coupled to one of said latches and an output, said output of each said bit comparator indicating a match when said inputs thereto are in identical logic states;
   first logic means having a plurality of inputs coupled to said outputs of said bit comparators and an output for providing a first indication if all said bit comparators indicate a match and a second indication otherwise; and
   second logic means having an input coupled to said output of said first logic means for generating an interrupt request responsive to said output of said first logic means.

8. An apparatus according to claim 7 wherein:
   each of said bit comparators has an enable input and, in the absence of an enable input present at said enable input, produces an output indicating a match regardless of the logic states of the other inputs thereto.

9. An apparatus according to claim 8 further comprising:
   a first control register coupled to said enable inputs of said bit comparators.

10. An apparatus according to claim 9 further comprising:
    a second control register coupled to said second logic means, said second control register containing a control bit to select whether said second logic means generates an interrupt request in response to said first indication or to said second indication.

11. In a digital data processor of the type having a plurality of data inputs and a plurality of data latches, each selectably coupled to a respective one of said data inputs, a method of generating an interrupt request comprising the steps of:
    storing a first bit pattern in said data latches;
    receiving a second bit pattern at said data inputs;
    comparing at least a portion of said first bit pattern with a portion of said second bit pattern;
    selecting one of a match mode and a mis-match mode;
    generating an interrupt request if said match mode is selected and if said portion of said first bit pattern is identical to said portion of said second bit pattern; and
    generating an interrupt request is said mis-match mode is selected and if said portion of said first bit pattern is not identical to said portion of said second bit pattern.

12. A method according to claim 11 wherein said step of comparing further comprises the step of:
    enabling a predetermined number of a plurality of bit comparators each having an input coupled to one of said data inputs and an input coupled to one of said data latches.

13. A method according to claim 12 wherein said steps of generating an interrupt request further compris the steps of: performing an AND function on outputs of said bit comparators; generating an interrupt request if said match mode is selected on an
    active result of said AND function; and generating an interrupt request if said mis-match mode is selected on an
    inactive result of said AND function.

14. A microcomputer comprising:
    an interrupt request line;
    an internal bus;
    a pin;
    a bi-directional interface coupled between the bus and the pin, the bi-directional interface further comprising a latch, first means for driving a logic state corresponding to contents of the latch onto the pin and second means for driving a logic state of the pin onto the bus;
    a comparator having a first input coupled to the pin, a second input coupled to the latch and an output; and
    interrupt logic having an input coupled to the output of the comparator and an output coupled to the interrupt request line.

15. A microcomputer according to claim 14 wherein the interrupt logic further comprises:
    selection means for selecting one of a match and a non-match condition;
    means for generating an interrupt request via the interrupt request line if the selection means selects the match condition and if the first and second inputs of the comparator are in identical logic states; and
    means for generating an interrupt request via the interrupt request line if the selection means selects the non-match condition and if the first and second inputs of the comparator are not in identical logic states.

16. A microcomputer according to claim 14 wherein the comparator further comprises:
    an enable input;
    an output of the comparators is in a first logic state if the comparators is enabled by the enable input and if the first and second inputs of the comparator are in identical logic states, the output of the comparator is in a second logic state if the comparator is enabled by the enable input and if the first and second inputs of the comparator are not in identical logic states and the output of the comparator is in the first logic state if the comparator is disabled by the enable input regardless of the logic states of the first and second inputs.

17. A microcomputer according to claim 16 wherein the interrupt logic further comprises:
  selection means for selecting one of a match and a non-match condition;
  means for generating an interrupt request via the interrupt request line if the selection means selects the match condition and if the output of the comparator is in the first logic state; and
  means for generating an interrupt request via the interrupt request line if the selection means selects the non-match condition and if the output of the comparator is in the second logic state.

18. A microcomputer according to claim 17 further comprising: means for enabling and disabling the interrupt logic.

19. A microcomputer comprising:
  an interrupt request line;
  an internal bus;
  a plurality of pins;
  a bi-directional data communication interface coupled between the internal bus and the plurality of pins;
  condition selection means for selecting a desired condition for each of the plurality of pins;
  condition determination means coupled to each of the plurality of pins and to the condition selection means for determining, for each pin, whether the desired condition is met; and
  interrupt generation logic coupled to the condition determination means and to the interrupt request line.

20. A microcomputer according to claim 19 further comprising:
  means for preventing a determination by the condition determination means that the desired condition is not met for a particular pin from effecting the interrupt generation logic.

21. A microcomputer according to claim 19 further comprising: means for enabling and disabling the interrupt generation logic.

* * * * *